No. 631,599. Patented Aug. 22, 1899.
J. T. TRENCH.
PNEUMATIC TIRE.
(Application filed Dec. 20, 1897.)
(No Model.)

WITNESSES

INVENTOR
John T. Trench
by Herbert W. T. Jenner
Attorney

UNITED STATES PATENT OFFICE.

JOHN TOWNSEND TRENCH, OF KENMARE, IRELAND.

PNEUMATIC TIRE.

SPECIFICATION forming part of Letters Patent No. 631,599, dated August 22, 1899.

Application filed December 20, 1897. Serial No. 662,609. (No model.)

*To all whom it may concern:*

Be it known that I, JOHN TOWNSEND TRENCH, land agent, a subject of the Queen of Great Britain, residing at Kenmare, Kerry county, Ireland, have invented a new and useful Improvement in Pneumatic Tires, (for which I have obtained a patent in Great Britain, No. 8,136, bearing date the 17th of April, 1896,) of which the following is a full and complete specification.

This invention relates to an improved construction of that type of pneumatic tire known as "tubeless"—*i. e.*, a tire consisting of a split or open tube the divided edges of which form an air-tight joint when the tire is mounted in the wheel-rim, so that it is capable of containing air under pressure without the use of a separate or independent air-tube.

Figure 1:
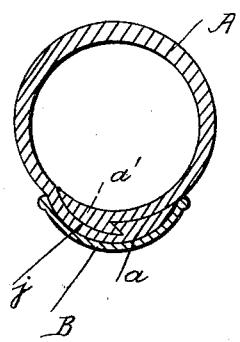
Figure 2:
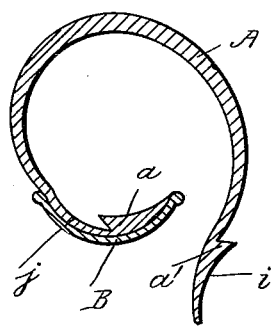
Figure 3:
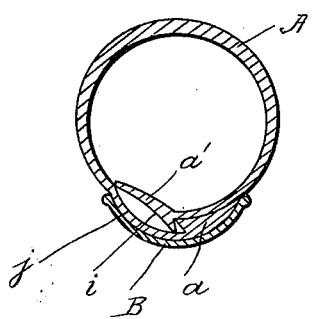

In the accompanying drawings, which illustrate by way of example some methods of carrying this invention into practice, Figure 1 is a view in transverse section showing the tire mounted in the wheel-rim. Fig. 2 is a similar view showing one edge of the tire dismounted. Fig. 3 is a similar section showing the enlargements in an intermediate position and when first loosely assembled in the rim.

The tire consists of a band A of india-rubber reinforced with canvas or of other fabric treated so as to be air-tight. The edges of the band A have hook-shaped enlargements $a$ and $a'$ formed on or attached to them. The enlargement $a$ is on the opposite face of the band from the enlargement $a'$, so that when the band is folded or rolled into tubular form the hook-shaped enlargements engage with one another. The hook-shaped enlargement $a'$ has a concave face $i$. When the enlargement $a$ is seated in the wheel-rim B, a concave surface $j$ is formed on the band behind the enlargement $a$. The concave face $i$ is reversely curved from the face $j$, and when the parts are loosely assembled together, as shown in Fig. 3, a space is formed between the faces $i$ and $j$.

An initial air-tight joint is formed by pressing upon the enlargement $a'$, so as to flatten the arch formed by the enlargement $a'$, and thereby forcing the hooks into intimate contact. The parts may be pressed together in any approved manner, as by pressing by hand upon the periphery of the tire before inflating it. When an initial air-tight joint is formed in this manner before inflating the tire, the inflation can be accomplished with certainty and without any air leaking out of the tire during the act of inflation. The pressure of the air in the tire subsequently holds the hook-shaped enlargements in air-tight contact.

What I claim is—

1. A pneumatic single-tube tire formed of a band of elastic material having single hook-shaped interlocking enlargements on its edges, a curved face $j$ being formed behind the enlargement which is first seated in the rim, and the other enlargement having a concave face $i$ curved in the reverse direction from the face $j$ and operating to cause the enlargements to form an air-tight joint when pressed together by hand before inflating the tire, substantially as set forth.

2. A pneumatic tire having hook-shaped interlocking enlargements on its edges, the inner of the said enlargements having a concave face $i$ which forms an arch when the enlargements are first engaged and which enables the hooks of the said enlargements to be driven into forcible contact to form an air-tight joint when the said arch is flattened, substantially as set forth.

JOHN TOWNSEND TRENCH.

Witnesses:
WILLIAM H. JANES,
ALFRED K. CROOD.